United States Patent
Sato et al.

(10) Patent No.: US 7,441,248 B2
(45) Date of Patent: Oct. 21, 2008

(54) DATA TRANSFER SCHEME USING CACHING TECHNIQUE FOR REDUCING NETWORK LOAD

(75) Inventors: Hideaki Sato, Kanagawa (JP);
Tatsunori Kanai, Kanagawa (JP);
Hideki Yoshida, Kanagawa (JP);
Toshibumi Seki, Kanagawa (JP);
Kenichiro Yoshii, Tokyo (JP); Takayuki Miyazawa, Kanagawa (JP); Yasuhiro Kimura, Kanagawa (JP); Haruhiko Toyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 631 days.

(21) Appl. No.: 10/253,517

(22) Filed: Sep. 25, 2002

(65) Prior Publication Data

US 2003/0061337 A1 Mar. 27, 2003

(30) Foreign Application Priority Data

Sep. 27, 2001 (JP) .............................. 2001-295364

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)

(52) U.S. Cl. ...................... 719/313; 709/203; 709/217; 709/247

(58) Field of Classification Search ................. 719/313, 719/310, 320; 709/223, 203, 235, 247, 212–219; 726/12; 711/113, 118–146
See application file for complete search history.

(56) References Cited

U.S. PATENT DOCUMENTS

| | | | | |
|---|---|---|---|---|
| 6,345,307 | B1 * | 2/2002 | Booth | 709/247 |
| 6,427,187 | B2 * | 7/2002 | Malcolm | 711/119 |
| 6,606,663 | B1 * | 8/2003 | Liao et al. | 709/229 |
| 6,801,927 | B1 * | 10/2004 | Smith et al. | 709/202 |
| 6,912,591 | B2 * | 6/2005 | Lash | 709/246 |
| 7,103,016 | B1 * | 9/2006 | Duffy et al. | 370/312 |
| 2002/0143892 | A1 * | 10/2002 | Mogul | 709/217 |
| 2002/0178341 | A1 * | 11/2002 | Frank | 711/216 |

FOREIGN PATENT DOCUMENTS

EP 1011244 A2 * 6/2000

OTHER PUBLICATIONS

Davison, "A Web Caching Primer" Aug. 2001, IEEE, pp. 38-45.*

(Continued)

*Primary Examiner*—Meng-Ai An
*Assistant Examiner*—Qing-Yuan Wu
(74) *Attorney, Agent, or Firm*—Oblon, Spivak, McClelland, Maier & Neustadt, P.C.

(57) ABSTRACT

In a data transfer device, presence/absence of a prescribed header in the received request message is analyzed, and information indicating the presence/absence of the prescribed header, or information indicating either presence or absence of the prescribed header when the prescribed header is either present or absent as a result of analysis is stored. Then, when a reply message corresponding to the request message is received, the presence/absence of the prescribed header is checked by referring to the stored information, and the reply message is transferred according to a result of checking.

16 Claims, 11 Drawing Sheets

OTHER PUBLICATIONS

Tewari et al., "Design Considerations for Distributed Caching on the Internet", 1999, IEEE, pp. 1-12.*

Barron C. Housel Ph.d, et al., "A System for Optimizing Web Browsing in a Wireless Environment", Process of the 2$^{ND}$ Annual Conference on Mobile Computing and Networking (MOBICOM), 1996, pp. 108-116.

Vegard Holmedahl, et al., "Cooperative Caching of Dynamic Content on a Distributed Web Server", Process of Seventh IEEE International Symposium on High Performance Distributed Computing, 1998, pp. 1-8.

U.S. Appl. No. 10/092,540, filed Mar. 8, 2002, pending.
U.S. Appl. No. 10/094,462, filed Mar. 11, 2002, pending.
U.S. Appl. No. 10/167,413, filed Jun. 13, 2002, pending.
U.S. Appl. No. 10/253,517, filed Sep. 25, 2002, Sato et al.
U.S. Appl. No. 10/396,521, filed Mar. 26, 2003, Koba et al.

* cited by examiner

ASP SERVER CENTER 2

BRANCH 4

ASP SERVER CENTER 2

BRANCH 4

DATA TRANSFER SCHEME USING CACHING TECHNIQUE FOR REDUCING NETWORK LOAD

CROSS-REFERENCE TO RELATED APPLICATIONS

The subject matter of the present application is related to that disclosed in the assignee's copending applications, including Ser. Nos. 10/092,540, 10/094,462 and 10/167,413.

BACKGROUND OF THE INVENTION

1. Field of the Invention

The present invention relates to a data transfer scheme for carrying out data transfer at a data transfer device on behalf of another device.

2. Description of the Related Art

The client-server type information system formed by servers for providing various services through a network and clients for requesting desired services to the servers has been widely used. In particular, the World Wide Web system (which is also simply called Web) formed by Web servers and clients that communicate with each other by using the HTTP protocol on the Internet is the very widely used client-server type information system. Usually, a server program is operating on a server and a prescribed tool (program) such as a browser is operating on a client. The contents of the services provided on the Internet are also wide ranging so that there are various existing services including services for providing, delivering or transferring information such as that of text, still image, video and audio (home pages, e-mails, and digital contents, for example) or programs, electronic shop services for selling goods, reservation services for seats, rooms, etc., agency services for various contracts, etc., and services in new styles are appearing steadily.

Now, in the client-server type information system such as the Web, the service is provided basically by carrying out data transfer between the client and the server, regardless of the style of the service to be provided. Consequently, a capacity (bandwidth) of the network to be used for communications between the client and the server tends to be a bottleneck of the entire system. For this reason, usually, the caching technique has been used in order to reduce the network load.

In the case of the Web system, the browser or the like that is operating on the client often uses a cache mechanism for caching recently accessed data. In the Web, accesses are made by specifying information or services by using names called URLs, so that among data that are returned in response to information or services requested to the Web servers in the past, those data that are cachable are recorded in the cache on the client in correspondence with their URLs. In this case, when an information or service with the same URL as that recorded in the cache is requested, if it is possible to judge that the response data recorded in the cache has not become obsolete, it is possible to eliminate a communication between the client and the Web server by returning that response data recorded in the cache.

When a plurality of users are existing on a LAN inside offices of an enterprise, a LAN of a research organization or a LAN inside a home, it is popular to provide a proxy server between that LAN and the Internet and provide the cache mechanism in the proxy server. The cache inside the client (the cache of the browser, for example) will be operated as a dedicated cache of that client or user, but the cache of the proxy server on the LAN will be operated as a cache shared by users of the plurality of clients. For this reason, the cache of the proxy server works efficiently even in the case of making an access to the URL accessed by another client in the past.

Now, in the Web, communications between the client and the server are carried out by the protocol called HTTP. The HTTP protocol uses a set of a "request message" to be sent from the client to the server and a "reply message" to be returned from the server to the client in response to that request.

The request message is formed by a "request header" and a "request body". The request header contains various information necessary for the access such as a URL for specifying an information or service to be accessed and a method name indicating the type of access. The request body contains data to be sent to the server. Such data contained in the request body are also referred to as "request data".

The reply message is formed by a "reply header" and a "reply body". The reply header contains information such as a processing result status, and the reply body contains the requested information or data of the processing result of the requested service. Such data contained in the reply body are also referred to as "reply data".

The major methods for the request message that are used for accesses of information or services include a "GET method" that reads out an information on the server, a "PUT method" that writes data of the user into the server, and a "POST method" that receives a processing result from the server in response to the request. Besides them, methods such as a "DELETE method" are also defined.

In many cases, the request body of the request message in the GET method and the reply body of the reply message in the PUT method are empty. The request body of the request message in the POST method contains information to be used for the processing on the server side if necessary, and the reply body of the reply message in the POST method contains data obtained as a result of the processing of the server.

The data to be read out from the server by the GET method can be classified into "dynamic data" that are to be generated at the server side at a time of each request and "static data" that are to be returned by just reading the stored data in the server. The dynamic data can possibly have different contents at different occasions of reading even for the same URL, so that in many cases, the server returns the reply message with the reply header that includes an indication that it is not cachable. Consequently, what are to be the caching targets among the Web data are the static data.

These static data can be classified into "shared data" that can be accessed by unspecified many users and "private data" that allowed accesses only to the specific user by the user authentication. The former shared data are cachable for any caches. However, the latter private data are not cachable for a shared cache such as that of the proxy server (because there is a need for the server to return the private data after the user authentication). The private data are cachable in the case of a personal dedicated cache such as that of the browser.

In the POST method, the server returns the result by the reply message with the reply header that includes an indication that it is not cachable in general. For this reason, the reply data of the POST method are usually not the caching target.

In the PUT method, data are to be sent to the server so that there is no processing that involves the cache.

In the conventional Web cache, the caching targets are the static contents. Many information or services on the Web were disclosed to unspecified many users and the information was updated not frequently, so that the rate of the static contents were very high and therefore even the conventional caching technique was effective in reducing the network load.

However, in conjunction with the spread of a system in which the user makes accesses to the information or services on the server through the network by using the Web browser such as that of Web based ASP (Application Service Provider), the amount of data that cannot be handled by the conventional caching technique is increasing. For example:

there are many private data for which the accessible users are limited by the user authentication;

there are many dynamic data to be generated by referring to the back-end database;

there are many cases of using the POST method such as those of the accounting slip processing and the searching; and there are many cases of using the PUT method for the purpose of sharing information within a group.

As a consequence, the use of the conventional caching technique alone has been becoming rather ineffective as a method for reducing the network load.

BRIEF SUMMARY OF THE INVENTION

It is therefore an object of the present invention to provide a data transfer scheme using a caching technique and/or a compression technique which is capable of reducing the network load of a network connecting between data transfer devices.

According to one aspect of the present invention there is provided a data transfer device, comprising: a request receiving unit configured to receive a request message; an analysis unit configured to analyze presence/absence of a prescribed header by analyzing the request message received by the request receiving unit; a storing unit configured to store information indicating the presence/absence of the prescribed header, or information indicating either presence or absence of the prescribed header when the prescribed header is either present or absent as a result of analysis by the analysis unit; a reply receiving unit configured to receive a reply message corresponding to the request message; a checking unit configured to check the presence/absence of the prescribed header by referring to the storing unit when the reply message is received by the reply receiving unit; and a transfer unit configured to transfer the reply message according to a result of checking by the checking unit.

According to another aspect of the present invention there is provided a data transfer device, comprising: a request receiving unit configured to receive a request message; an analysis unit configured to analyze the request message received by the request receiving unit; a storing unit configured to store an analysis result obtained by the analysis unit; a reply receiving unit configured to receive a reply message corresponding to the request message; and a processing unit configured to carry out a processing with respect to the reply message by referring to the analysis result stored by the storing unit when the reply message is received by the reply receiving unit.

According to another aspect of the present invention there is provided a data transfer method, comprising: (a) receiving a request message; (b) analyzing presence/absence of a prescribed header by analyzing the request message received by the step (a); (c) storing information indicating the presence/absence of the prescribed header, or information indicating either presence or absence of the prescribed header when the prescribed header is either present or absent as a result of analysis by the step (b); (d) receiving a reply message corresponding to the request message; (e) checking the presence/absence of the prescribed header by referring to the information stored by the storing step when the reply message is received by the step (d); and (f) transferring the reply message according to a result of checking by the step (e).

According to another aspect of the present invention there is provided a data transfer method, comprising: (a) receiving a request message; (b) analyzing the request message received by the step (a); (c) storing an analysis result obtained by the step (b); (d) receiving a reply message corresponding to the request message; and (e) carrying out a processing with respect to the reply message by referring to the analysis result stored by the step (c) when the reply message is received by the step (d).

According to another aspect of the present invention there is provided a computer program product for causing a computer to function as a data transfer device, the computer program product comprising: a first computer program code for causing the computer to receive a request message; a second computer program code for causing the computer to analyze presence/absence of a prescribed header by analyzing the request message received; a third computer program code for causing the computer to store information indicating the presence/absence of the prescribed header, or information indicating either presence or absence of the prescribed header when the prescribed header is either present or absent as a result of analysis by the second computer program code; a fourth computer program code for causing the computer to receive a reply message corresponding to the request message; a fifth computer program code for causing the computer to check the presence/absence of the prescribed header by referring to the information stored by the third computer program code when the reply message is received; and a sixth computer program code for causing the computer to transfer the reply message according to a result of checking by the fifth computer program code.

According to another aspect of the present invention there is provided a computer program product for causing a computer to function as a data transfer device, the computer program product comprising: a first computer program code for causing the computer to receive a request message; a second computer program code for causing the computer to analyze the request message received; a third computer program code for causing the computer to store an analysis result obtained by the second computer program code; a fourth computer program code for causing the computer to receive a reply message corresponding to the request message; and a fifth computer program code for causing the computer to carry out a processing with respect to the reply message by referring to the analysis result stored by the third computer program code when the reply message is received.

Other features and advantages of the present invention will become apparent from the following description taken in conjunction with the accompanying drawings.

DETAILED DESCRIPTION OF THE INVENTION

Referring now to FIG. 1 to FIG. 13, one embodiment of the data transfer scheme according to the present invention will be described in detail.

In the following, an exemplary case in which a WAN is the Internet, clients are connected to a LAN inside a branch 4, and the HTTP protocol is used will be described, but the present invention is also applicable to the cases where the WAN is other than the Internet, the cases where the clients are located at LAN other than the LAN inside a branch such as a LAN inside a home, and the cases where the protocol other than the HTTP protocol is to be used.

Figure 1:
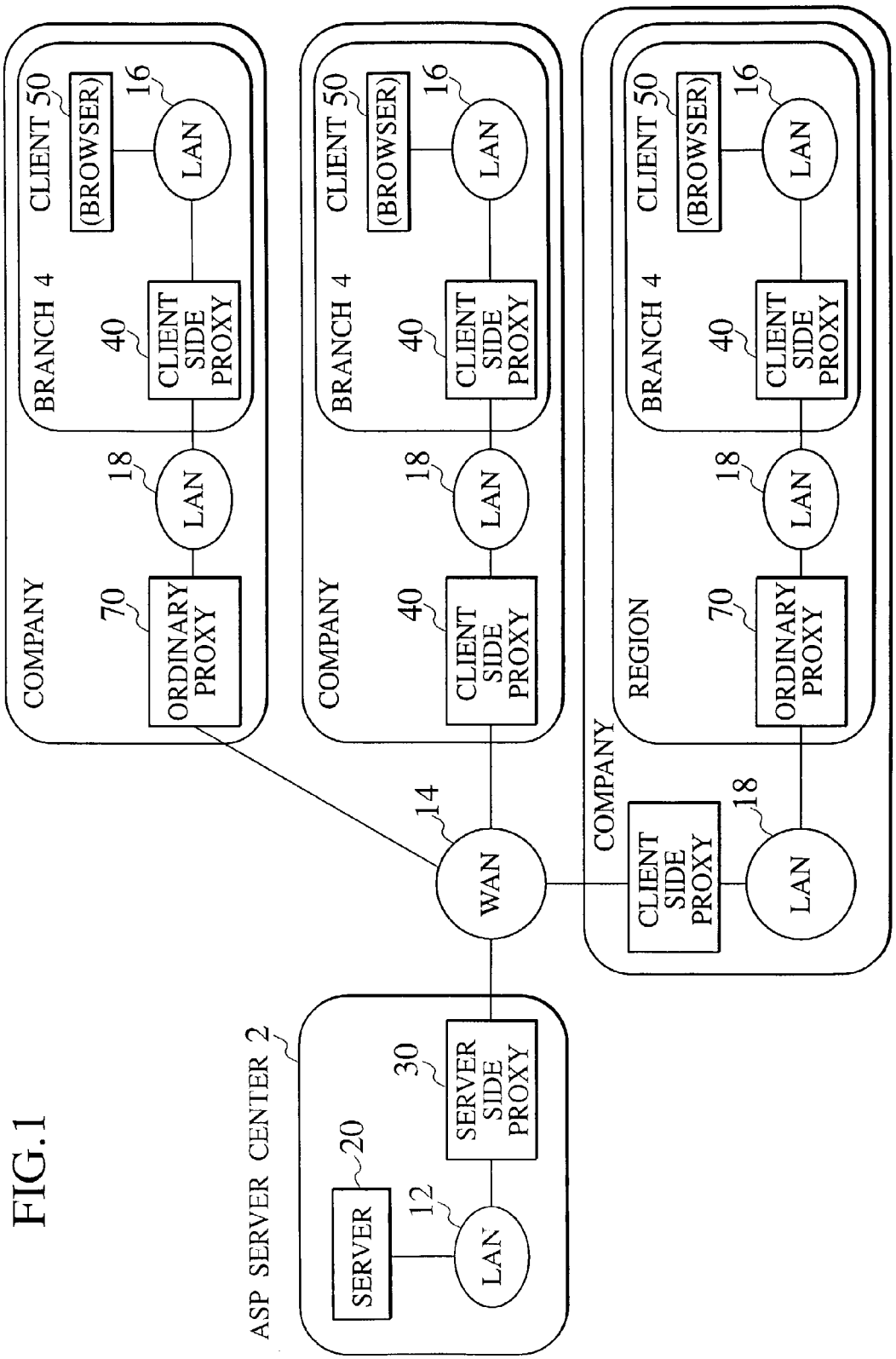
FIG. 1 is a block diagram showing an exemplary configuration of a computer network system according to one embodiment of the present invention.

FIG. 1 shows an exemplary overall configuration of a computer network system to which the present invention is applied. Here, a case involving three companies which have mutually different network forms is shown as an example of a case involving various network forms.

A local area network (LAN) 12 inside an ASP server center 2 and a local area network (LAN) 16 inside a branch of each company are connected through a wide area network (WAN) 14 such as the Internet or dedicated line, LAN 18 of the company for connecting branches, an ordinary proxy 70, a client side proxy 40, etc., such that a server 20 inside the ASP server center 2 and a client 50 inside each branch 4 are capable of carrying out communications. One or a plurality of servers are connected to the LAN 12 inside the ASP server center 2 and one or a plurality of clients are connected to the LAN 16 inside the branch. Also, a plurality of clients (not shown) are connected to the other LAN 18 inside each company either directly or through the ordinary proxy 70 and the client side proxy 40.

The Web based ASP provides services using various application programs from the server 20 provided at the ASP server center 2 to each company through the WAN 14, and a user can access these services by using a Web browser or the like on the client 50 provided inside the branch 4.

In such a configuration, the effective communication capacity (bandwidth) of the WAN 14 such as the Internet is lower than those of the LAN 12 inside the ASP server center 12 and those of the LAN 16 inside the branch, so that it can become a bottleneck of the performance that can cause the communication delay and give rise to the problem of the lower response performance of the applications.

For this reason, in this embodiment, two modules called a server side proxy 30 and a client side proxy 40 are provided respectively between the server 20 and the WAN 14 and between the client 50 and the WAN 14, and a fingerprint compression (FP compression) to be described below is carried out between them, such that the amount of communication data is reduced and the bottleneck of the wide area network is resolved.

Each one of the server 20, the server side proxy 30, the client proxy 40, the client 50 and the ordinary proxy 70 can be realized in a form of operating a software (a server program, a server side proxy program, a client side proxy program, a client program, or an ordinary proxy program respectively) on a computer. In this case, the computer will be provided with or connected with softwares such as OS, driver software, packet communication software and encryption software which have desired functions, and hardwares such as communication interface device, external memory device and input/output device. Also, in this case, it is preferable to use the graphical user interface (GUI) for the purpose of entering information from the user or a manager and presenting information to the user.

On the client 50 used by the user in order to utilize the service, a Web browser program or the like is operated according to the purpose. The user utilizes the service by sending a request message to a server that provides the desired service such as the information transfer or the order taking through the Internet from the Web browser and receiving a reply message, or repeating this procedure according to the need, for example. Of course, it is also possible to use a software other than the general purpose software like the Web browser, such as a dedicated software for the purpose of utilizing specific service. Also, the client can be a portable telephone terminal or the like that has the Internet function, for example, rather than the general purpose computer.

On the server 20, a prescribed server program is operated, to provide the service specific to that server site with respect to the user of the client 50.

Figure 2A:
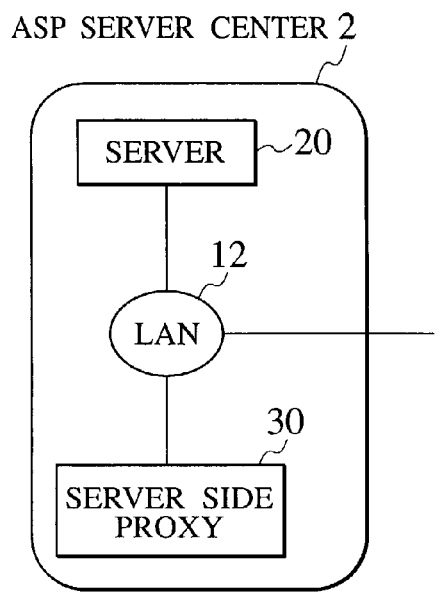
FIGS. 2A and 2B are block diagrams showing partial modified configurations of a computer network system according to one embodiment of the present invention.
Figure 3A:
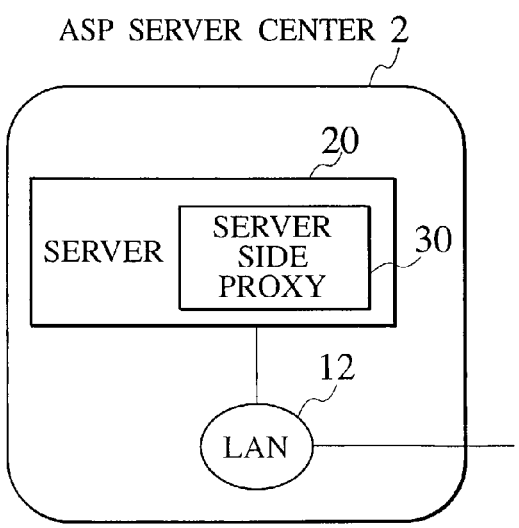
FIGS. 3A and 3B are block diagrams showing other partial modified configurations of a computer network system according to one embodiment of the present invention.

The server side proxy 30 can be provided to operate as a transparent proxy by being connected with both the LAN 12 inside the ASP server center 2 and the WAN 14 as shown in FIG. 1. The server side proxy 30 can also be provided on the LAN 12 inside the ASP server center 2 as shown in FIG. 2A. The server side proxy 30 can also be realized as a built-in function of the server 20 as shown in FIG. 3A.

Figure 2B:
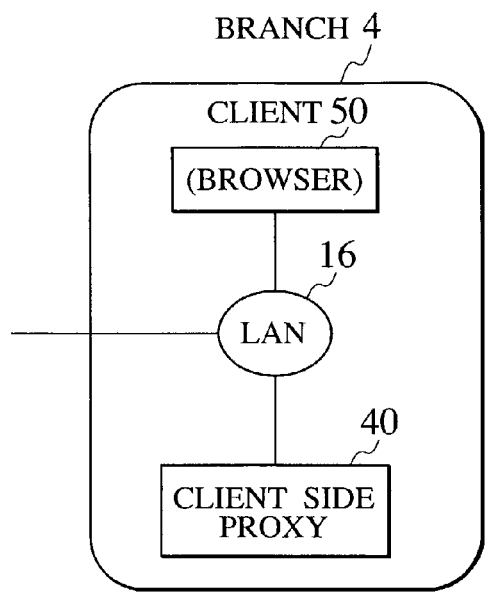
Figure 3B:
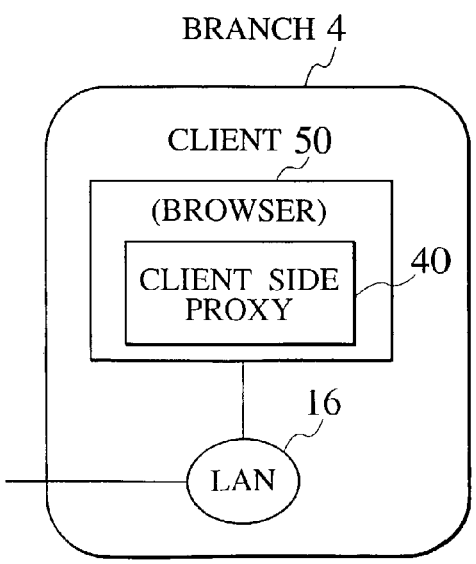

Similarly, the client side proxy 40 can be provided to operate as a transparent proxy by being connected with both the LAN 16 inside the branch and the LAN 18 as shown in FIG. 1. The client side proxy 40 can also be provided on the LAN 16 inside the branch as shown in FIG. 2B. The client side proxy 40 can also be realized as a built-in function of the browser or the like that operates on the client 50 as shown in FIG. 3B. The client side proxy 40 can also be realized as a personal client side proxy that is operated on the client 50 on which the browser or the like is operated.

Also, the client side proxy 40 between the WAN 14 and the LAN 18 for carrying out the relaying between the WAN 14 and the LAN 18, for example, may be also provided as a proxy of a plurality of clients (not shown) of the company (such as the central company in FIG. 1).

Also, the ordinary proxy 70 between the WAN 14 and the LAN 18 for carrying out the relaying between the WAN 14 and the LAN 18, for example, may be also provided as a proxy of a plurality of clients (not shown) of the company (such as the top company in FIG. 1). Note that the ordinary proxy 70 stands for an HTTP proxy server that is currently in general use, while the server side proxy 30 and the client side proxy 40 stand for new HTTP proxy servers having the function for reducing the communication data by carrying out the FP compression to be described below.

Figure 4:
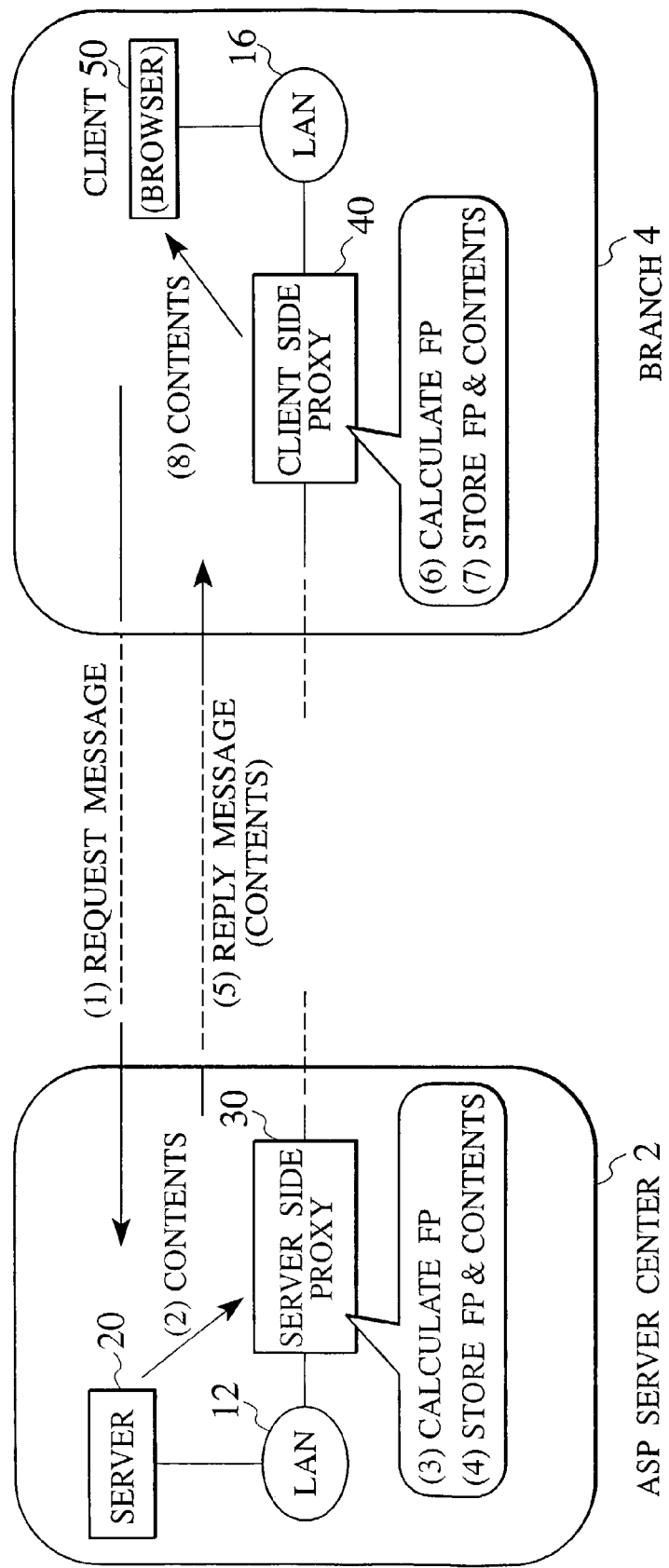
FIG. 4 is a diagram showing basic operations in the computer network system according to one embodiment of the present invention.
Figure 5:
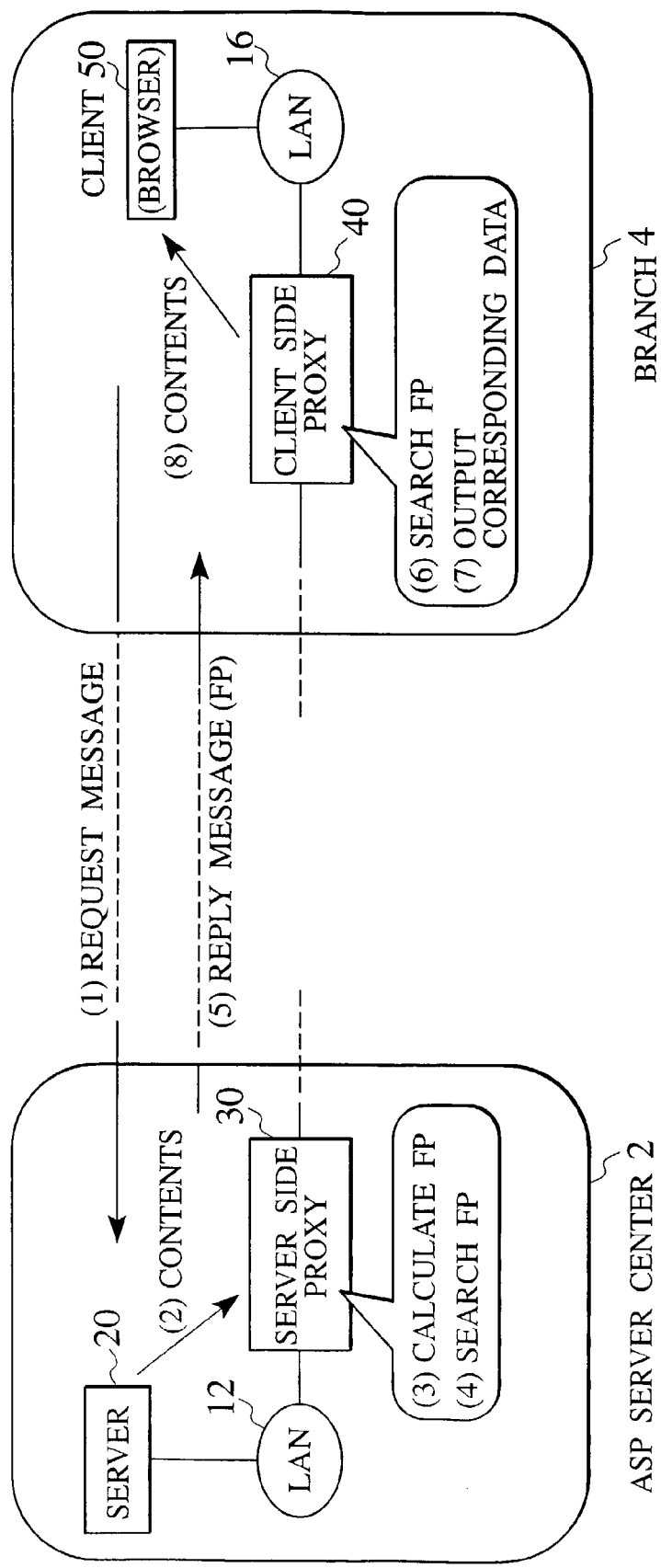
FIG. 5 is a diagram showing other basic operations in the computer network system according to one embodiment of the present invention.

FIG. 4 and FIG. 5 show conceptual flows in the above described computer network system according to this embodiment.

FIG. 4 shows the operation flow in the case of caching the Web contents on the server 20 into the server side proxy 30 and the client side proxy 40.

First, the user makes a request by specifying the URL of that Web contents in order to read out the Web contents stored in a desired server, from the browser of the client 50 inside the branch 4.

This request is notified to the server 20 through the network (step (1) of FIG. 4). Upon receiving this notification, the server 20 reads out the requested Web contents, and transmits the requested Web contents to the server side proxy 30 (step (2) of FIG. 4). The server side proxy 30 calculates the fingerprint (FP) of the received Web contents (step (3) of FIG. 4), and stores the calculated FP in correspondence to the Web contents (step (4) of FIG. 4). Also, the server side proxy 30 sends the received Web contents as a reply to the branch (step (5) of FIG. 4).

The client side proxy 40 calculates the fingerprint (FP) of the received Web contents (step (6) of FIG. 4), and stores the calculated FP in correspondence to the Web contents (step (7) of FIG. 4). The client side proxy 40 also transmits the Web contents to the client 50 (step (8) of FIG. 4). By the above operation, the Web contents are cached into the server side proxy 30 and the client side proxy 40.

Next, FIG. 5 shows the operation flow in the case where the Web contents are already cached in the server side proxy 30 and the client side proxy 40.

First, the user makes a request by specifying the URL of that Web contents in order to read out the Web contents stored in a desired server, from the browser of the client 50 inside the branch 4.

This request is notified to the server 20 through the network (step (1) of FIG. 5). Upon receiving this notification, the server 20 reads out the requested Web contents, and transmits the requested Web contents to the server side proxy 30 (step (2) of FIG. 5). The server side proxy 30 calculates the fingerprint (FP) of the received Web contents (step (3) of FIG. 5), and carries out the search regarding whether the same FP as the calculated FP is already stored in the server side proxy 30 or not (step (4) of FIG. 5). Here, the same FP as the calculated FP is already stored, so that the server side proxy 30 sends that FP as a reply to the branch, rather than sending the received Web contents to the branch (step (5) of FIG. 5).

The client side proxy 40 carries out the search inside the cache by using the received FP (step (6) of FIG. 5), and reads out the Web contents stored in correspondence to the FP found by the search (step (7) of FIG. 5). The client side proxy 40 also transmits the Web contents read out from the cache to the client 50 (step (8) of FIG. 5). By the above operation, the Web contents to be transmitted from the server side proxy 30 to the client side proxy 40 are sent in a form of the FP with a small data amount, so that the bottleneck of the wide area network can be resolved.

Now, the fingerprint will be described in detail at this point.

Each one of the server side proxy 30 and the client side proxy 40 of this embodiment has a caching mechanism called fingerprint cache (FP cache). The fingerprint cache records and manages data to be exchanged by the HTTP protocol, by using a name called fingerprint (FP).

Figure 6:
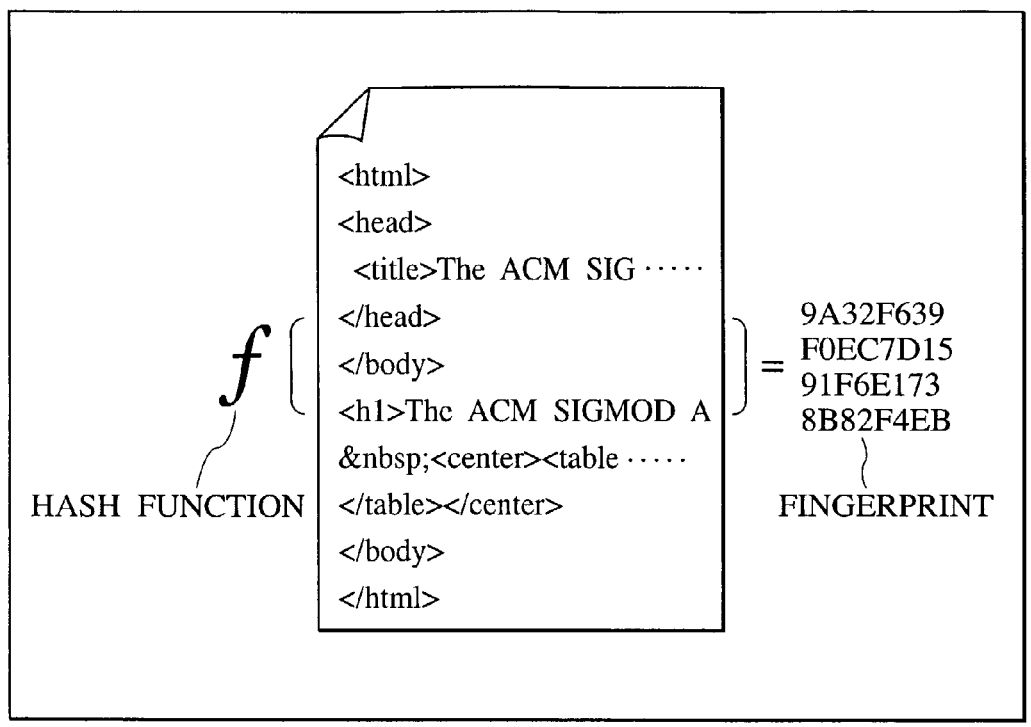
FIG. 6 is a diagram showing a fingerprint used in one embodiment of the present invention.

As shown in FIG. 6, the fingerprint is a short numerical value that is determined by using a prescribed calculation method (a hash function in the example of FIG. 6) from the content of the data (contents in the example of FIG. 6) to be exchanged by the HTTP protocol. This numerical value may have a variable length, but the numerical value with a fixed length is easier to handle from a viewpoint of the ease of the processing.

As a method for calculating the fingerprint, it is possible to use the well known hash function such as MD-5, SHA-1, etc. These hash functions are already in use for the electronic signature with respect to data, and they can convert arbitrary data given to them into a numerical value of 128 bits in the case of MD-5 or a numerical value of 160 bits in the case of SHA-1. The characteristic of these hash function is that, when two data X1 and X2 are given and the data X1 and the data X2 are identical, the hash value calculated with respect to the data X1 and the hash value calculated with respect to the data X2 will be the same, but when two different data A and B are given, the hash value calculated with respect to the data A and the hash value calculated with respect to the data B will be different at a very high probability (there is a possibility for the hash values calculated with respect to two different data A and B to be the same in principle, but that possibility is negligibly small in practice).

Figure 7:
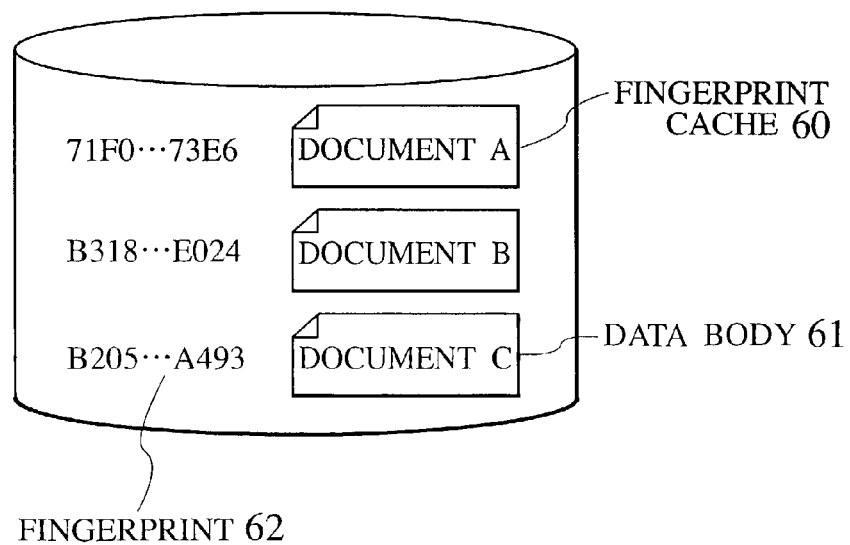
FIG. 7 is a diagram showing a fingerprint cache used in one embodiment of the present invention.

As shown in FIG. 7, the fingerprint cache 60 to be provided in the server side proxy 30 and the client side proxy 40 is recording and managing the data body 61 that were exchanged by using the HTTP protocol in the past, by using the fingerprint value 62 calculated from that data body 61 as its name.

For example, when the data are to be transferred from the server side proxy 30 to the client side proxy 40 by using the HTTP protocol, the server side proxy 30 calculates the fingerprint of that data, and if the data corresponding to that fingerprint exists in the fingerprint cache, it implies that (data with the same content as) this data had been transferred in the past, so that the server side proxy 30 transfers the corresponding fingerprint value without transferring that data itself. The client side proxy 40 that received the fingerprint can reproduce the data to be transferred by taking out the data corresponding to that fingerprint value from the fingerprint cache.

In this scheme (i.e., the sequence of data compression→data transfer→data decompression), it is possible to reduce the amount of data to be transferred through the network considerably because it suffices to send the fingerprint values for those data that are the same as the data already sent in the past. It is of course similar in the case of transferring data from the client side proxy 40 to the server side proxy 30.

For the convenience of the explanation, the compression of the amount of transfer data by replacing the data body of a message with the fingerprint by utilizing the fingerprint cache at a time of the data transfer between the server side proxy 30 and the client side proxy 40 will be referred to as a fingerprint compression (FP compression) hereafter.

Note that every message can be a target for applying the FP compression (i.e., a target for which the processing to replace the data with the fingerprint is to be carried out) between the server side proxy 30 and the client side proxy 40, but it is also possible to set those messages that satisfy a prescribed condition as not targets for applying the FP compression (which are always to be transferred without the FP compression), in order to omit the application of the FP compression with respect to those messages for which the fingerprint cache effect cannot be expected, for example.

In this case, the prescribed condition can be that a prescribed information is described in the message header, for example. More specifically, the prescribed condition can be that an information indicating the GET method and an information indicating the request are described in the message header, for example. As another example, the prescribed condition can be that data to be transferred is null or in a very compact size. Of course there are many other variations for the prescribed condition, and it is also possible to use a plurality of conditions in combination.

Now, between the client 50 and the server 20, as shown in an exemplary overall configuration of the computer network system of FIG. 1 to which the present invention is to be applied, it is general to have various other proxy devices existing between the branch 4 and the ASP server center 2.

Here, for example, FIG. 1 shows the following three cases in which those existing between the branch 4 and the ASP server center 2 include:

(1) an ordinary proxy (upper right of FIG. 1);
(2) a client side proxy (middle right of FIG. 1); and
(3) a client side proxy and an ordinary proxy (lower right of FIG. 1).

Note that, although not shown in the figure, it is also possible to have another company (having a currently general network form) for which a plurality of clients (browsers) are connected only through the ordinary proxy 70 without introducing the client side proxy 40, as another company to be connected to the WAN 14.

In such cases where proxies are existing between the branch 4 and the ASP server center 2, if the fingerprint compression as described above is simply applied between the client side proxy 40 of the branch 4 and the server side proxy 30 of the ASP server center 2, the following problems may arise.

(a) The server side proxy 30 that received a reply message for a request cannot judge whether the reply message should be transmitted by converting it into the FP (if possible) or the reply message should be transmitted without converting it into the FP. In other words, if the request has passed only the ordinary proxy 70, the FP converted message should not be sent because the ordinary proxy does not have the FP function, but if the request has passed the client side proxy 40, it suffices to send the FP provided that FP of the reply message to be sent is stored. However, currently it is not possible to judge whether the FP should be sent or not.

(b) In addition, when the ordinary proxy 70 is existing between the server side proxy 30 and the client side proxy 40, for example, the cache function of the ordinary proxy 70 will cache even the fingerprint that cannot be utilized there.

(c) In the case where the client side proxy 40 is existing between the branch 4 and the ASP server center 2, this intermediate client side proxy 40 itself cannot judge that it is an intermediate proxy so that it will decompress the fingerprint before sending it further.

The server side proxy and the client side proxy of this embodiment are devised to resolve these problems.

Figure 8:
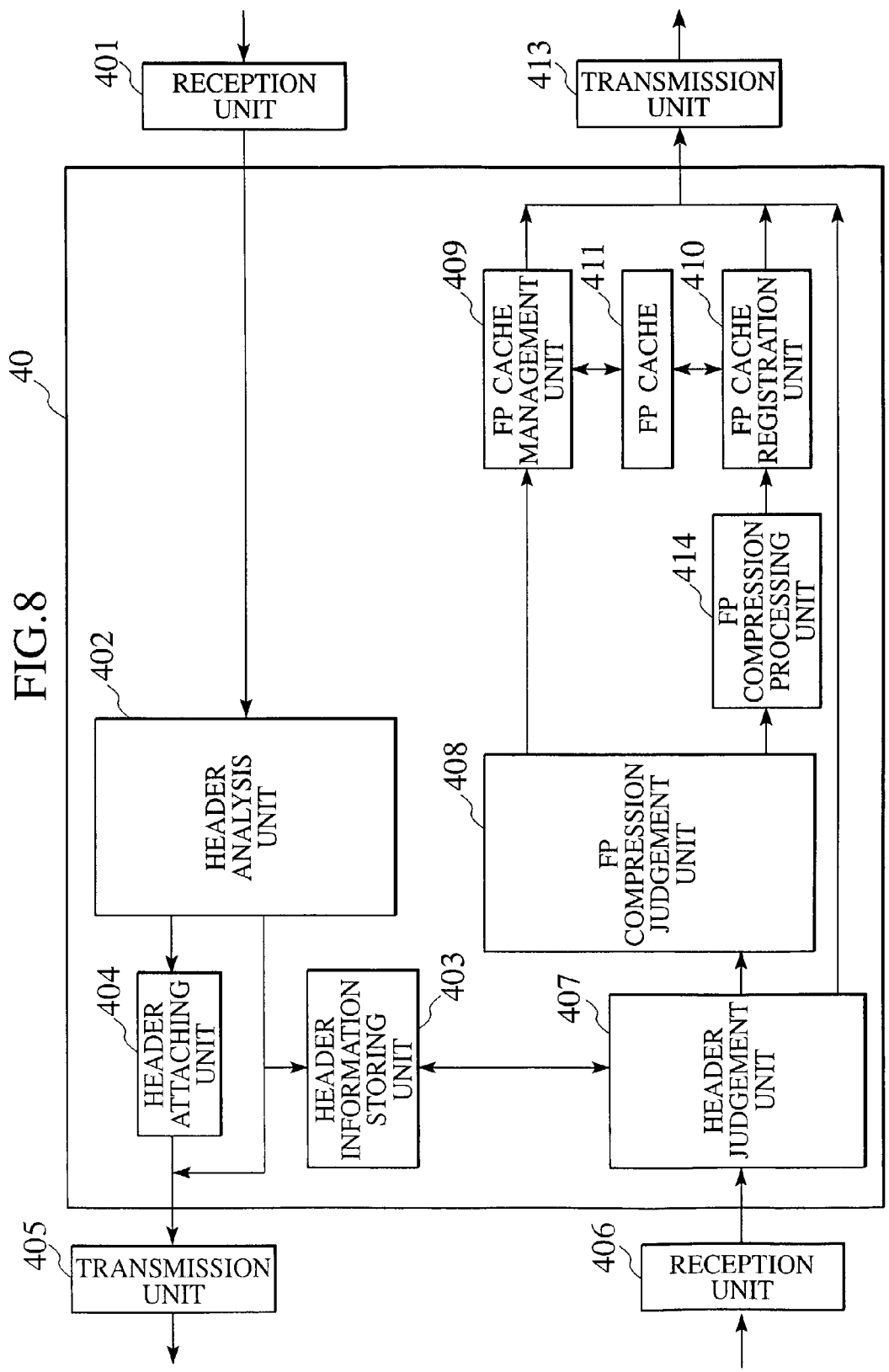
FIG. 8 is a block diagram showing a functional configuration of a client side proxy according to one embodiment of the present invention.
Figure 9:
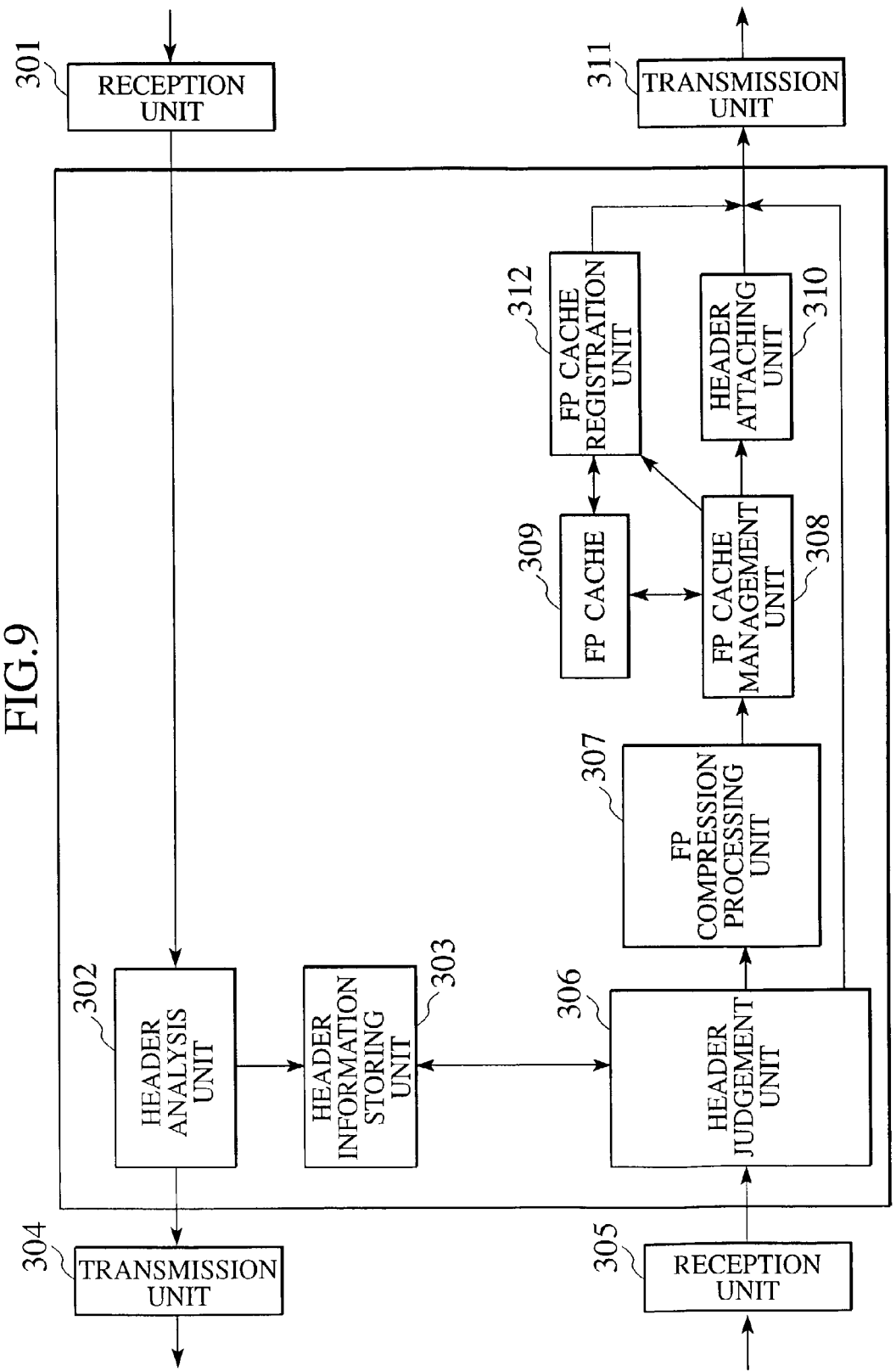
FIG. 9 is a block diagram showing a functional configuration of a server side proxy according to one embodiment of the present invention.

FIG. 8 and FIG. 9 shows functional configurations of the client side proxy 40 and the server side proxy 30 of this embodiment, which will now be described in detail. Note that FIG. 8 and FIG. 9 mainly show the functional configurations related to the data transfer between the client side proxy 40 and the server side proxy 30.

Here, the request message and the reply message will be described first.

As already described in the description of the related art section above, the request message comprises a request header and a request body, and the request header contains a region in which information to be written by the user can be defined, besides regions for storing prescribed information. In this embodiment, information indicating that it has passed a proxy that carries out the FP compression will be written into this region that can be defined by the user when the request message is to be transferred by the client side proxy 40. Here, this information is expressed as FP_USE, and it will be referred to as an FP_USE header.

Also as already described in the description of the related art section above, the reply message comprises a reply header and a reply body, and in the reply header it is possible to attach a NO_CACHE header that can be recognized by devices compatible with the HTTP protocol, besides regions for storing prescribed information. This NO_CACHE header implies that the caching of the reply body is prohibited. In this embodiment, NO_CACHE will be written into this region by the server side proxy 30. As a result, the device compatible with HTTP protocol will not cache the FP if the NO_CACHE header is contained in the received reply message.

Also, the reply header contains a region in which information to be written by the user can be defined, besides regions for storing prescribed information. In this embodiment, the FP header will be attached to this region that can be defined by the user in the case where the reply body is the FP value obtained by the FP compression.

In the following, the configuration of the client side proxy 40 will be described with reference to FIG. 8.

A reception unit 401 receives the request message from the client 50. A header analysis unit 402 receives the request message received at the reception unit 401, analyzes the request header, and detects presence/absence of the FP_USE header. A header information storing unit 403 stores information indicating that this request message has the FP_USE header, when the request message with the FP_USE header is detected at the header analysis unit 402. A header attaching unit 404 attaches the FP_USE header to the request header of the request message when the request message without the FP_USE header is detected at the header analysis unit 402. A transmission unit 405 transmits the request message sent from the header analysis unit 402 or the header attaching unit 404 toward the server 20.

A reception unit 406 receives the reply message which is a response for the request message. A header judgement unit 407 judges whether the FP_USE header was contained in the request message corresponding to this reply message or not by referring to the header information storing unit 403.

Note that the header information storing unit 403 only stores information when the FP_USE header was contained in the request header of the request message as already mentioned above, so that the fact that this information exists in the header information storing unit 403 implies that this client side proxy 40 is not a client side proxy that is closest to the requesting client 50, and the fact that this information does not exist in the header information storing unit 403 implies that this client side proxy-is a client side proxy that is closest to the requesting client 50.

When it is judged that this client side proxy 40 is not a client side proxy closest to the client 50, the header judgement unit 407 sends the received reply message as it is to a transmission unit 413. Also, when it is judged that this client side proxy 40 is a client side proxy closest to the client 50, the header judgement unit 407 sends this reply message to an FP compression judgement unit 408.

An FP compression judgement unit 408 judges whether this reply message is FP compressed or not by detecting whether the received reply message contains the FP header or not. When it is FP compressed, the FP compression judgement unit 408 sends the reply message to an FP cache management unit 409. When it is not FP compressed, the FP compression judgement unit 408 sends the reply message to an FP compression processing unit 414.

An FP cache 411 stores FP corresponding to previously FP compressed data and the contents before the FP compression for that FP in correspondence.

An FP compression processing unit 414 applies the fingerprint compression. The FP value obtained by the FP compression is registered into the FP cache 411 along with the contents by an FP cache registration unit 410.

An FP cache management unit 409 searches through the FP cache 411 by using the FP contained in that reply message, obtains the contents corresponding to the searched FP, changes the reply data of the reply message to the obtained contents, and sends the reply message to a transmission unit 413. An FP cache registration unit 410 receives the reply message from the FP compression judgement unit 408, obtains the FP of this reply data (contents), registers the FP and the contents in correspondence into the FP cache 411, and then sends the reply message to the transmission unit 413.

A transmission unit 413 transmits the received reply message to the client 50.

Note that FIG. 8 shows functional block configuration so that the reception unit 401 and the reception unit 406 are shown as separate blocks and the transmission unit 405 and the transmission unit 413 are shown as separate blocks, but the reception unit 401 and the reception unit 406 may be formed integrally and the transmission unit 405 and the transmission unit 413 may be formed integrally. It is also possible to form the reception unit 401 and the transmission 413 integrally and the transmission unit 405 and the reception unit 406 integrally as transmission and reception units.

This completes the description of the configuration of the client side proxy 40.

Next, the configuration of the server side proxy 30 will be described with reference to FIG. 9.

A reception unit 301 receives the request message. A header analysis unit 302 analyzes the request header of the request message, checks whether the FP_USE header is attached or not, and notifies an header information storing unit 303 when the FP_USE header is attached.

A header information storing unit 303 stores information indicating that this request message has the FP_USE header. The request message is then transmitted from a transmission unit 304 to the server 20. Note that the server 20 receives the request message, acquires the desired contents requested from the client 50, and transmit them toward the client 50 as a reply message.

A reception unit 305 receives the reply message from the server 20. When the reply message from the reception unit 305 is received, a header judgement unit 306 judges whether the FP_USE header was contained in the request message corresponding to this reply message or not by referring to the header information storing unit 303. This judgement is effectively a judgement as to whether the client side proxy 40 has existed or not in a course traced by the request message. When it is judged that the FP_USE header was absent (the client side proxy did not exist), the header judgement unit 306 sends the reply message as it is to a transmission unit 311. Also, when it is judged that the FP_USE header was present, the header judgement unit 306 sends this reply message to an FP compression processing unit 307.

An FP compression processing unit 307 generates the FP by using the fingerprint compression method described above. An FP cache management unit 308 searches through an FP cache 309 by using the FP received from the FP compression processing unit 307. When that FP is found, the FP cache management unit 308 changes the reply data of the reply message to the FP, and sends the reply message to a header attaching unit 310. When that FP is not found in the FP cache 309 by the FP cache management unit 308, an FP cache registration unit 312 registers the FP and the data in correspondence into the FP cache 309, and then sends the reply message as it is to a transmission unit 311.

A header attaching unit 310 attaches the NO_CACHE header to the reply header of the reply message from the FP cache management unit 308, and sends the reply message to the transmission unit 311.

This completes the description of the server side proxy 30.

Figure 10:
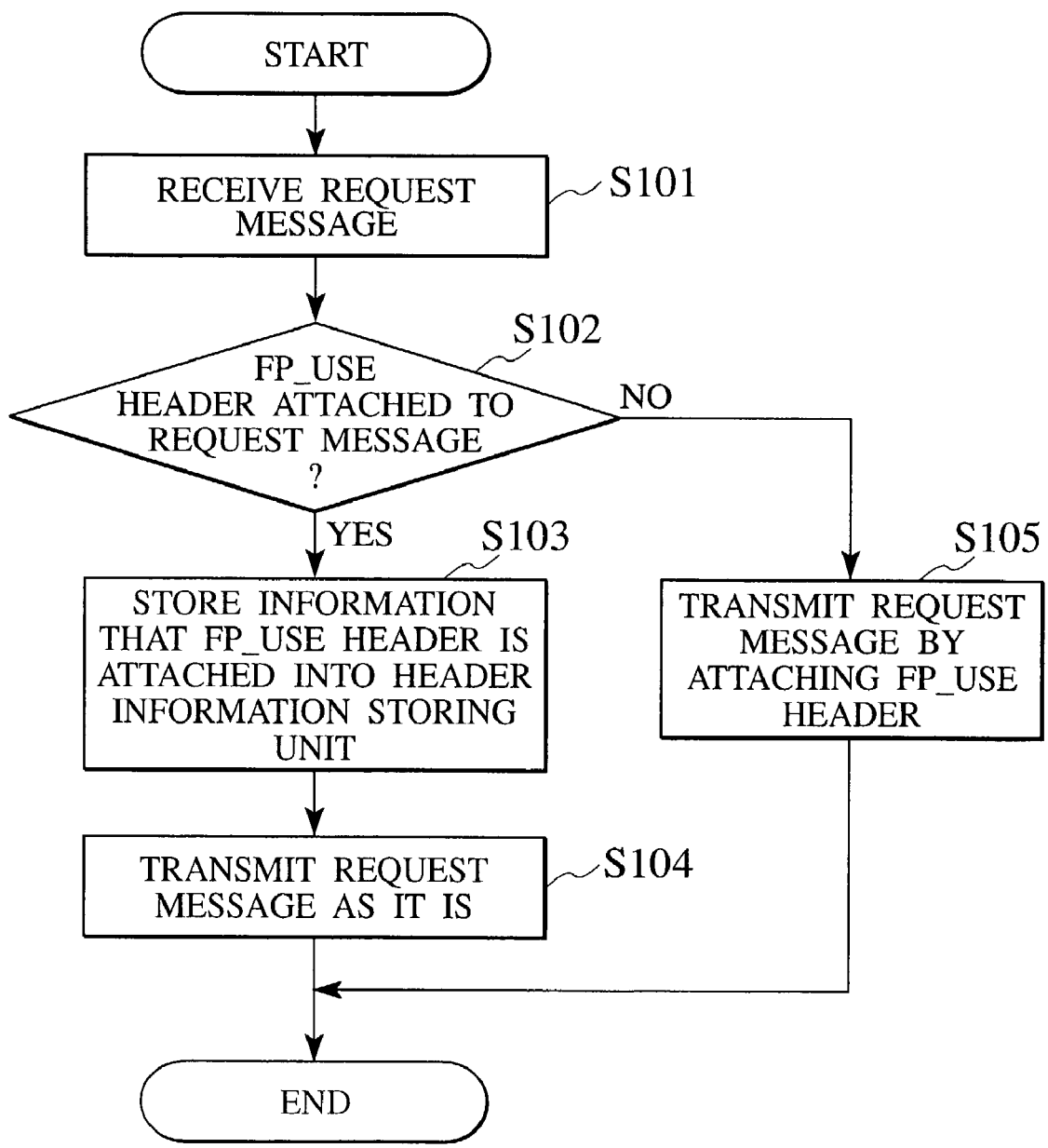
FIG. 10 is a flow chart showing an exemplary processing procedure of the client side proxy at a time of receiving a request message according to one embodiment of the present invention.

FIG. 10 shows an exemplary processing procedure of the client side proxy 40 when a single request message from the client is received.

The client side proxy 40 receives the request message from the client through the LAN 16 or the LAN 18 at the reception unit 401 (step S101). The header analysis unit 402 analyzes the request header of the received request message, and detects whether the FP_USE header is attached or not (step S102). When the FP_USE header is attached as a result of the step S102, the header information storing unit 403 stores information indicating that the FP_USE header is attached to this request message (step S103) and sends the request message as it is to the transmission unit 405, and the transmission unit 405 transmits this request message toward the server side proxy 30 (step S104).

On the other hand, when the FP_USE header is not attached as a result of the step S102, the header attaching unit 404 attaches the FP_USE header to a prescribed area in the request header of this request message, and the transmission unit 405 transmits this request message with the FP_USE header toward the server side proxy 30 (step S105).

This embodiment assumes the use of the "keep alive" communication scheme in which the state of having the connection set up is maintained since the request message is transmitted by the client 50 until the reply message is received. For this reason, it suffices for the header information storing unit 403 to use a flag of the minimum one bit for indicating whether the FP_USE header is attached to the request message or not.

Note that it is also possible to use various other methods besides this communication scheme as long as it is a scheme for handling a plurality of connections in parallel by the switching processing, such as that the flag described above and the identification information for identifying the request message are stored in correspondence.

Figure 11:
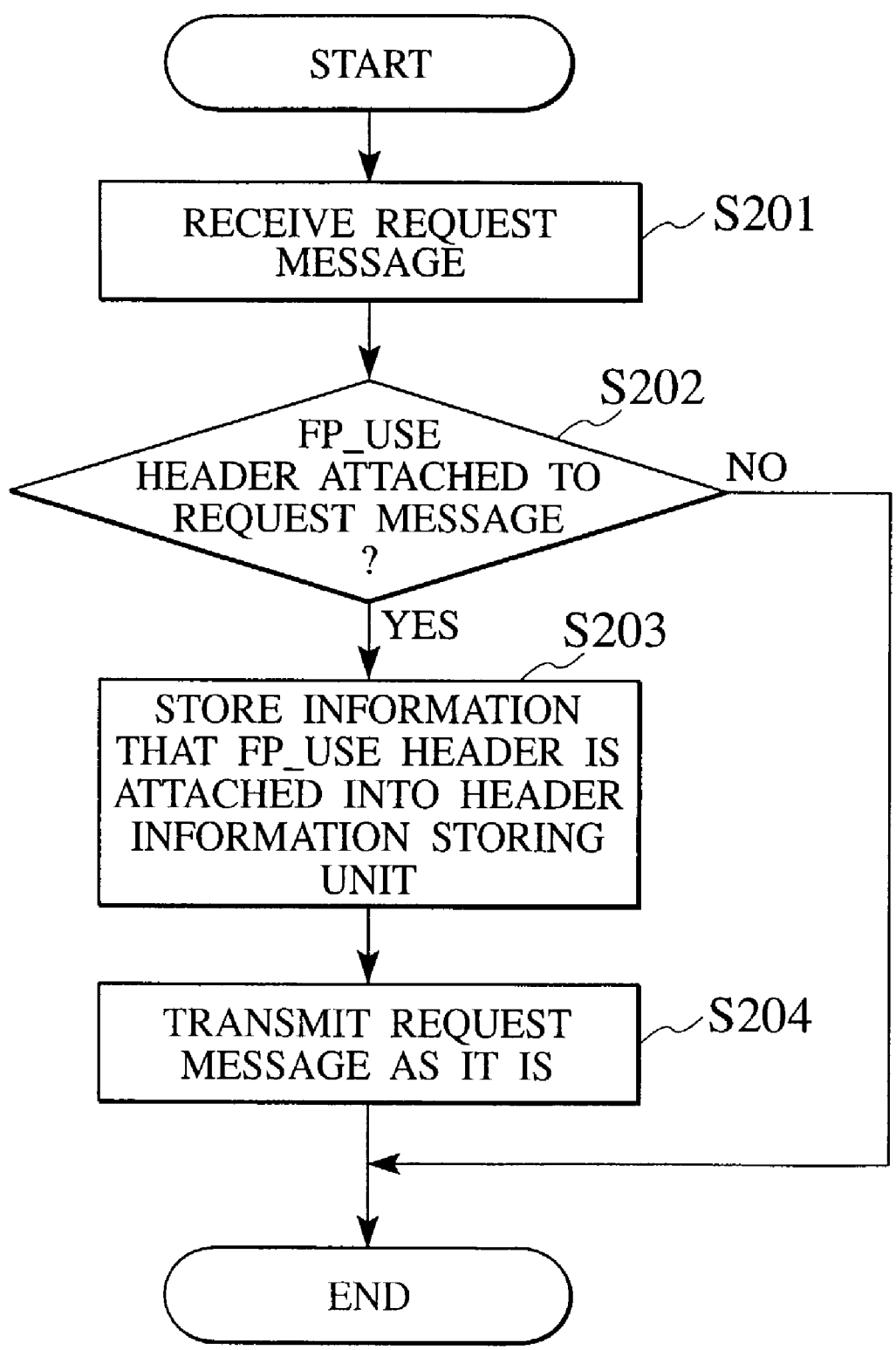
FIG. 11 is a flow chart showing one exemplary processing procedure of the server side proxy at a time of receiving a request message according to one embodiment of the present invention.

FIG. 11 shows an exemplary processing procedure of the server side proxy 30 when a single request message is received through the WAN 14.

The server side proxy 30 receives the request message at the reception unit 301 (step S201). The header analysis unit 302 analyzes the request header of the received request message, and detects whether the FP_USE header is attached or not (step S202). When the FP_USE header is attached as a result of the step S202, the header information storing unit 303 stores information indicating that the FP_USE header is attached to this request message (step S203). The received request message is transmitted from the transmission unit 304 to the server 20 (step S204).

The server 20 receives the request message, applies the processing of the known method, and transmits the reply message toward the client that issued the request message.

Figure 12:
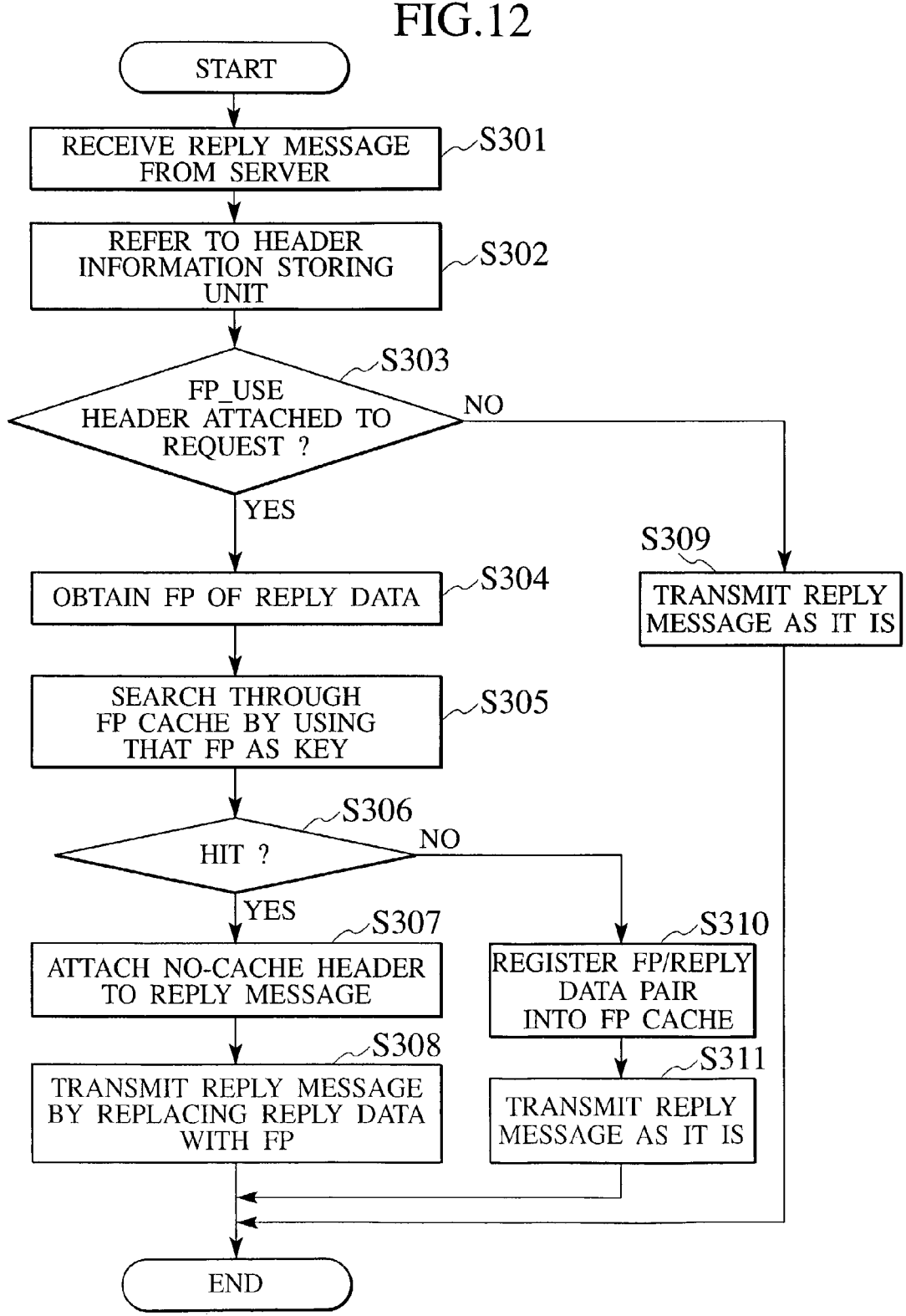
FIG. 12 is a flow chart showing another exemplary processing procedure of the server side proxy at a time of receiving a reply message according to one embodiment of the present invention.

FIG. 12 shows an exemplary processing procedure of the server side proxy 30 when a single reply message is received from the server 20.

The server side proxy 30 receives the reply message from the server 20 at the reception unit 305 (step S301).

The header judgement unit 306 refers to the header information storing unit 303 (step S302), and judges whether the FP_USE header was attached to the request message corresponding to this reply message or not (step S303). This effectively judges whether at least one client side proxy 40 exists between the client 50 and the sever 20 (the server side proxy 30) or not.

When it is judged that the FP_USE header was not attached as a result of the step S303, the reply message is transmitted as it is by the transmission unit 311 toward the client 50 through the WAN 14 (step S309).

On the other hand, when it is judged that the FP_USE header was attached as a result of the step S303, the FP compression processing unit 307 obtains the FP of the reply data (=contents) of the reply message (step S304). Then, the FP cache management unit 308 searches through the FP cache 309 by using the obtained FP as a key (step S305), and checks whether a set of this FP value and the corresponding data is registered in the FP cache 309 or not (step S306).

When the FP is registered in the FP cache 309 as a result of the step S306, the header attaching unit 310 attaches the NO_CACHE header to the reply header of the reply message (step S307). Then, the reply data of the reply message is changed to the FP obtained at the step S304 and the FP header is attached. Then, the transmission unit 311 transmits the reply message toward the client 50 through the WAN 14 (step S308).

When the FP is not registered in the FP cache 309 as a result of the step S306, the FP cache registration unit 312 registers that FP value and the reply data in correspondence (by using the FP value as a key) into the FP cache 309 (step S310). Then, the transmission unit 311 transmits the reply message as it is toward the client 50 through the WAN 14 (step S311).

Figure 13:
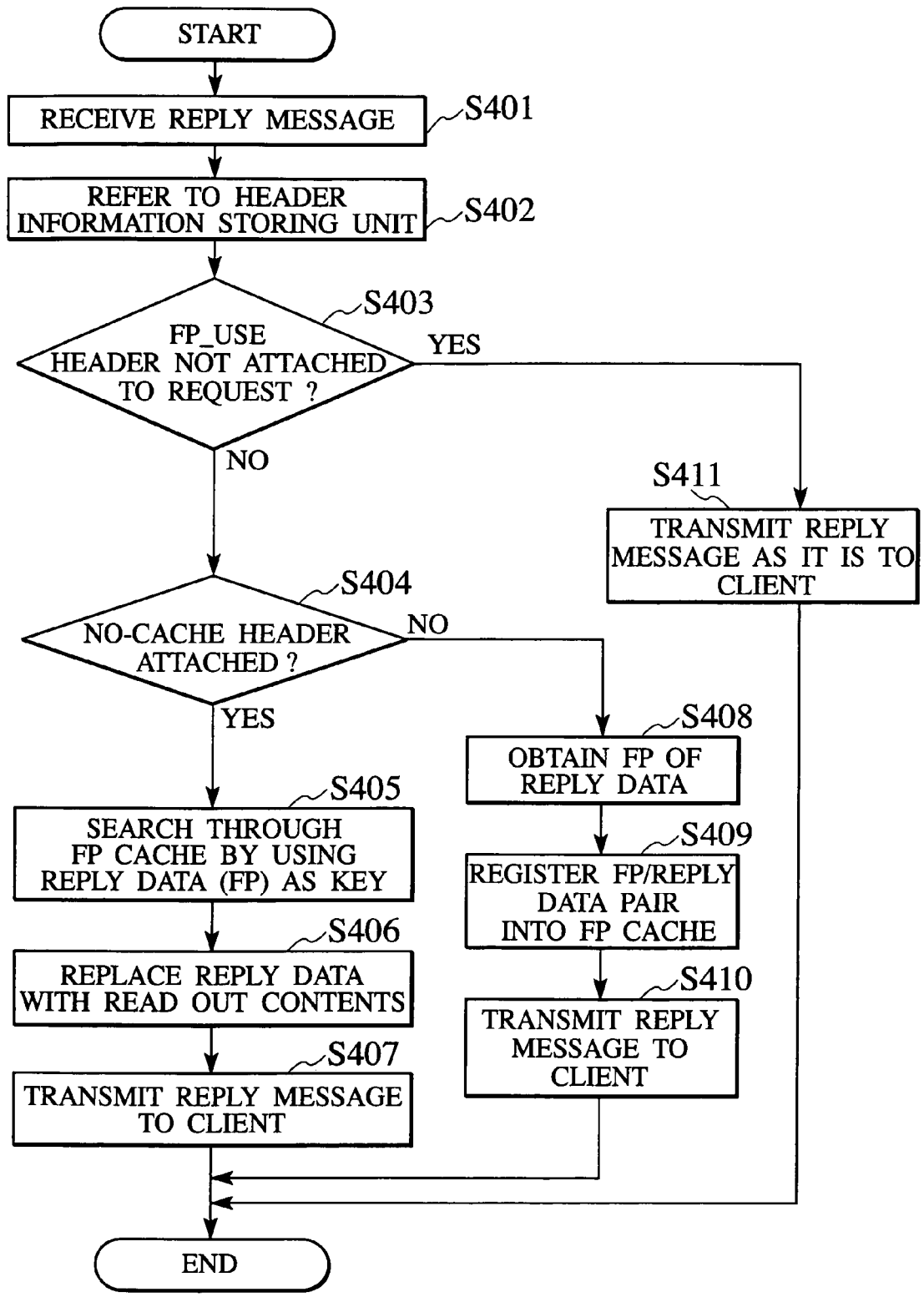
FIG. 13 is a flow chart showing another exemplary processing procedure of the client side proxy at a time of receiving a reply message according to one embodiment of the present invention.

FIG. 13 shows an exemplary processing procedure of the client side proxy 40 when a single reply message is received.

The client side proxy 40 receives the reply message at the reception unit 406 (step S401).

The header judgement unit 407 refers to the header information storing unit 403 (step S402), and judges whether the FP_USE header was attached to the request message corresponding to this reply message (step S403). This effectively judges whether the client side proxy 40 exists between this client side proxy 40 and the client 50 or not. For example, among the two client side proxies 40 on the central right of FIG. 1, the header information storing unit 403 of the left client side proxy 40 stores information that the FP_USE header was attached, while the header information storing unit 403 of the right client side proxy 40 stores nothing as the FP_USE header was not attached.

When it is judged that the FP_USE header was attached as a result of the step S403, the transmission unit 413 transmits the reply message as it is toward the client 50 through the LAN 14 and the like (step S411).

When it is judged that the FP_USE header was not attached as a result of the step S403, the FP compression judgement unit 408 judges whether the reply data is FP compressed or not by checking presence/absence of the NO_CACHE header in the reply header (step S404). When the NO_CACHE header is present, it implies that it is FP compressed.

When it is judged that the reply data is FP compressed as a result of the step S404, the reply data of the reply message is the FP so that the FP cache management unit 409 searches through the FP cache 411 by using that reply data (=FP) as a key (step S405). The contents corresponding to that FP found by this search are read out, and the reply data of the reply message is changed to these contents (step S406). The transmission unit 413 transmits this changed reply message toward the client 50 (step S407).

When it is judged that the reply data is not FP compressed as a result of the step S404, the FP compression processing unit 414 obtains the FP of the reply data (=contents) (step S408). The FP cache registration unit 410 registers the obtained FP and that reply data (=contents) in correspondence (by using the FP value as a key) into the FP cache 411 (step S409). Then, the transmission unit 413 transmits the reply message as it is toward the client 50 (step S410).

According to this embodiment of the present invention described above, the above described client side proxy 40 operates according to its location. For example, when the client side proxy 40 is a client side proxy closest to the client 50, the reply data to be transmitted to the client is always the (non-FP compressed) raw data.

Also, for example, when the client side proxy 40 is an intermediate proxy, it is operated to carry out only the transfer of the reply data without applying any processing. Because of such operations, it becomes possible to construct a system that can be operated correctly even when the client side proxy 40 or the ordinary proxy 70 is connected between the server side proxy 30 and the client side proxy 40.

Also, even when the ordinary proxy exists, it can be operated correctly without caching the FP data erroneously.

Note that the client side proxy 40 of this embodiment stores information indicating that the FP_USE header is attached when the FP_USE header is attached to the request message, but it is also possible to store information indicating that the FP_USE header is not attached when the FP_USE header is not attached to the request message in a reversed manner. Similarly, it is also possible to store information indicating that the FP_USE is attached (at this client side proxy 40) when the FP_USE header was not attached to the request message. In such a case, it suffices for the header judgement unit 407 to handle this client side proxy 40 as a client side proxy closest to the client 50 when this information is stored in the header information storing unit 403. It is also possible to use a flag for indicating presence/absence of the FP_USE header in the header information storing unit 403 such that the header judgement unit 407 judges whether it is a client side proxy 40 closest to the client 50 or not according to ON/OFF of that flag.

Also, the server side proxy 30 of this embodiment transmits the reply message to be transmitted by attaching only either the data or the FP value, but in the case of transmitting the data while storing the FP value (as in the case of NO at the step S306), it is also possible to send the reply message by attaching the FP value as well. In the case of using such a configuration, there is a need to provide a function for extracting the FP value from the received reply message in the client side proxy 40, but the function for carrying out the FP compression becomes unnecessary so that the overall speed can be made faster.

Also, up to this point, the embodiment in which the entire data contained in one message is a target for applying the FP compression (a target for the registration into the fingerprint cache) has been described, but in the case where the data contained in one message is formed by a set of prescribed unit data, for example, it is also possible to set only a part of the unit data contained in one message as a target for applying the FP compression (a target for the registration into the fingerprint cache).

As described, according to the present invention, correspondences between data and their names are registered at the data transfer devices and the corresponding names are transferred, instead of transferring the data, for those data for which the correspondences are registered, so that it is possible to reduce the amount of transfer data among the data transfer devices.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the server side proxy and the client side proxy of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A data transfer device having a function of compressing data to be transferred and decompressing received data, comprising:
   a request receiving unit configured to receive from a requesting device a request message that requests a requested device to send desired data;
   an analysis unit configured to analyze whether the request message received by the request receiving unit includes a prescribed header indicating a presence of another data transfer device having the function;
   a storing unit configured to store therein information indicating whether the request message includes the prescribed header or not;
   a request transfer unit configured to transfer the request message without making any change when the prescribed header is included in the request message, and attach the prescribed header to the request message and then transfer the request message when the prescribed header is not included in the request message;
   a reply receiving unit configured to receive a reply message corresponding to the request message;
   a checking unit configured to refer to the storing unit and check whether the prescribed header was included in the request message corresponding to the reply message received by the reply receiving unit; and
   a reply transfer unit configured to transfer to the requesting device the reply message according to a result of checking by the checking unit,
   wherein the reply transfer unit transfers to the requesting device the reply message without making any change when the checking unit checks that the prescribed header was included.

2. A data transfer device having a function of compressing data to be transferred and decompressing received data, comprising:
   a request receiving unit configured to receive from a requesting device a request message that requests a requested device to send desired data;
   an analysis unit configured to analyze whether the request message received by the request receiving unit includes a prescribed header indicating a presence of another data transfer device having the function;
   a storing unit configured to store therein information indicating whether the request message includes the prescribed header or not;
   a request transfer unit configured to transfer the request message without making any change when the prescribed header is included in the request message, and attach the prescribed header to the request message and then transfer the request message when the prescribed header is not included in the request message;
   a reply receiving unit configured to receive a reply message corresponding to the request message;
   a checking unit configured to refer to the storing unit and check whether the prescribed header was included in the request message corresponding to the reply message received by the reply receiving unit;
   a reply transfer unit configured to transfer to the requesting device the reply message according to a result of checking by the checking unit; and
   a judgment unit configured to judge whether the reply message includes a specific header different from the prescribed header when the checking unit checks that the prescribed header was not included.

3. The data transfer device of claim 2, further comprising:
   a memory unit configured to store in advance at least one set of data that can be requested by the request message and a compressed data obtained by compressing each data of the at least one set of data in correspondence; and
   a management unit configured to generate a new reply message when the judgment unit judges that the reply message includes the specific header, by searching through the memory unit by using the compressed data included in the reply message, reading out the data corresponding to the compressed data, and replacing the compressed data included in the reply message with the data corresponding to the compressed information,
   wherein the reply transfer unit transfers the new reply message generated by the management unit.

4. A data transfer device having a function of compressing data to be transferred and decompressing received data, comprising:
   a request receiving unit configured to receive a request message that requests a requested device to send desired data;
   an analysis unit configured to analyze whether the request message received by the request receiving unit includes a prescribed header indicating a presence of another data transfer device having the function;
   a storing unit configured to store therein information indicating whether the request message includes the prescribed header or not;

a request transfer unit configured to transfer the request message to the requested device;

a reply receiving unit configured to receive a reply message corresponding to the request message from the requested device;

a checking unit configured to refer to the storing unit and check whether the prescribed header was included in the request message corresponding to the reply message received by the reply receiving unit; and a reply transfer unit configured to transfer the reply message according to a result of checking by the checking unit, wherein the reply transfer unit transfers the reply message without making any change when the checking unit checks that the prescribed header was not included.

5. A data transfer device having a function of compressing data to be transferred and decompressing received data, comprising:

a request receiving unit configured to receive a request message that requests a requested device to send desired data;

an analysis unit configured to analyze whether the request message received by the request receiving unit includes a prescribed header indicating a presence of another data transfer device having the function;

a storing unit configured to store therein information indicating whether the request message includes the prescribed header or not;

a request transfer unit configured to transfer the request message to the requested device;

a reply receiving unit configured to receive a reply message corresponding to the request message from the requested device;

a checking unit configured to refer to the storing unit and check whether the prescribed header was included in the request message corresponding to the reply message received by the reply receiving unit;

a reply transfer unit configured to transfer the reply message according to a result of checking by the checking unit;

a memory unit configured to store in advance at least one set of data that can be requested by the request message and a compressed data obtained by compressing each data of the at least one set of data in correspondence; and a management unit configured to judge whether a compressed data obtained by compressing a requested data included in the reply message is included in the memory unit when the checking unit checks that the prescribed header was included, wherein the reply transfer unit transfers the reply message including the compressed data obtained by compressing the requested data included in the reply message when the management unit judges that the compressed data obtained by compressing the requested data included in the reply message is included in the memory unit.

6. The data transfer device of claim 5, further comprising:

a registration unit configured to register the requested data and the compressed data corresponding thereto in the memory unit when the management unit judges that the compressed data obtained by compressing the requested data included in the reply message is not included in the memory unit, wherein the reply transfer unit transfers the requested data included in the reply message when the management unit judges that the compressed data obtained by compressing the requested data included in the reply message is not included in the memory unit.

7. The data transfer device of claim 5, wherein the reply transfer unit transfers the reply message including the compressed data and a specific header different from the prescribed header when the management unit judges that the compressed data obtained by compressing the requested data included in the reply message is included in the memory unit.

8. The data transfer device of claim 7, wherein the specific header is a header for prohibiting caching of data contained in the reply message at a device capable of handling HTTP protocol.

9. A computer program product stored in a medium, for causing a computer when executing the computer program product to function as a data transfer device having a function of compressing data to be transferred and decompressing received data, the computer program product comprising:

a first computer program code for causing the computer to receive from a requesting device a request message that requests a requested device to send desired data;

a second computer program code for causing the computer to analyze whether the request message received includes a prescribed header indicating a presence of another data transfer device having the function;

a third computer program code for causing the computer to store information indicating whether the request message includes the prescribed header or not; and a fourth computer program code for causing the computer to transfer the request message without making any change when the prescribed header is included in the request message and to attach the prescribed header to the request message and then transfer the request message when the prescribed header is not included in the request message;

a fifth computer program code for causing the computer to receive a reply message corresponding to the request message;

a sixth computer program code for causing the computer to refer to the information stored by the third computer program code and check whether the prescribed header was included in the request message corresponding to the reply message received; and a seventh computer program code for causing the computer to transfer to the requesting device the reply message according to a result of checking by the sixth computer program code, wherein the seventh computer program code transfers to the requesting device the reply message without making any change when the sixth computer program code checks that the prescribed header was included.

10. A computer program product stored in a medium, for causing a computer when executing the computer program product to function as a data transfer device having a function of compressing data to be transferred and decompressing received data, the computer program product comprising:

a first computer program code for causing the computer to receive from a requesting device a request message that requests a requested device to send desired data;

a second computer program code for causing the computer to analyze whether the request message received includes a prescribed header indicating a presence of another data transfer device having the function;

a third computer program code for causing the computer to store information indicating whether the request message includes the prescribed header or not;

a fourth computer program code for causing the computer to transfer the request message without making any change when the prescribed header is included in the request message and to attach the prescribed header to the request message and then transfer the request message when the prescribed header is not included in the request message;

a fifth computer program code for causing the computer to receive a reply message corresponding to the request message;

a sixth computer program code for causing the computer to refer to the information stored by the third computer program code and check whether the prescribed header was included in the request message corresponding to the reply message received;

a seventh computer program code for causing the computer to transfer to the requesting device the reply message according to a result of checking by the sixth computer program code; and an eighth computer program code for causing the computer to judge whether the reply message includes a specific header different from the prescribed header when the sixth computer program code checks that the prescribed header was not included.

11. The computer program product of claim 10, further comprising:

a ninth computer program code for causing the computer to store in advance at least one set of data that can be requested by the request message an a compressed data obtained by compressing each data of the at least one set of data in correspondence; and a tenth computer program code for causing the computer to generate a new reply message when the eighth computer program code judges that the reply message includes the specific header, by searching through the data stored by the ninth computer program code by using the compressed data included in the reply message, reading out the data corresponding to the compressed data, and replacing the compressed data included in the reply message with the data corresponding to the compressed information, wherein the seventh computer program code transfers the new reply message generated by the tenth computer program code.

12. A computer program product stored in a medium, for causing a computer when executing the computer program product to function as a data transfer device having a function of compressing data to be transferred and decompressing received data, the computer program product comprising:

a first computer program code for causing the computer to receive a request message that requests a requested device to send desired data;

a second computer program code for causing the computer to analyze whether the request message received includes a prescribed header indicating a presence of another data transfer device having the function;

a third computer program code for causing the computer to store information indicating whether the request message includes the prescribed header or not;

a fourth computer program code for causing the computer to transfer the request message to the requested device;

a fifth computer program code for causing the computer to receive a reply message corresponding to the request message from the requested device;

a sixth computer program code for causing the computer to refer to the information stored by the third computer program code and check whether the prescribed header was included in the request message corresponding to the reply message received; and a seventh computer program code for causing the computer to transfer the reply message according to a result of checking by the sixth computer program code, wherein the seventh computer program code transfers the reply message without making any change when the sixth computer program code checks that the prescribed header was not included.

13. A computer program product stored in a medium, for causing a computer when executing the computer program product to function as a data transfer device having a function of compressing data to be transferred and decompressing received data, the computer program product comprising:

a first computer program code for causing the computer to receive a request message that requests a requested device to send desired data;

a second computer program code for causing the computer to analyze whether the request message received includes a prescribed header indicating a presence of another data transfer device having the function;

a third computer program code for causing the computer to store information indicating whether the request message includes the prescribed header or not;

a fourth computer program code for causing the computer to transfer the request message to the requested device;

a fifth computer program code for causing the computer to receive a reply message corresponding to the request message from the requested device;

a sixth computer program code for causing the computer to refer to the information stored by the third computer program code and check whether the prescribed header was included in the request message corresponding to the reply message received;

a seventh computer program code for causing the computer to transfer the reply message according to a result of checking by the sixth computer program code;

an eighth computer program code for causing the computer to store in advance at least one set of data that can be requested by the request message and a compressed data obtained by compressing each data of the at least one set of data in correspondence; and a ninth computer program code for causing the computer to judge whether a compressed data obtained by compressing a requested data included in the reply message is included in the data stored by the eighth computer program code when the sixth computer program code checks that the prescribed header was included, wherein the seventh computer program code transfers the reply message including the compressed data obtained by compressing the requested data included in the reply message when the ninth computer program code judges that the compressed data obtained by compressing the requested data included in the reply message is included in the data stored by the eighth computer program code.

14. The computer program product of claim 13, further comprising:

a tenth computer program code for causing the computer to register the requested data and the compressed data corresponding thereto in the data stored by the eighth computer program code when the ninth computer program code judges that the compressed data obtained by compressing the requested data included in the reply message is not included in the data stored by the eighth computer program code, wherein the seventh computer program code transfers the requested data included in the reply message when the ninth computer program code judges that the compressed data obtained by compressing the requested data included in the reply message is not included in the data stored by the eighth computer program code.

15. The computer program product of claim 13, wherein the seventh computer program code transfers the reply message including the compressed data and a specific header different from the prescribed header when the ninth computer program code judges that the compressed data obtained by compressing the requested data included in the reply message is included in the data stored by the eighth computer program code.

16. The computer program product of claim 15, wherein the specific header is a header for prohibiting caching of data contained in the reply message at a device capable of handling HTTP protocol.

* * * * *